United States Patent

Neathery, Jr.

[15] 3,656,000

[45] Apr. 11, 1972

[54] FREQUENCY TO VOLTAGE CONVERTER WITH IMPROVED TEMPERATURE STABILITY

[72] Inventor: John L. Neathery, Jr., Austin, Tex.

[73] Assignee: Nuclear-Chicago Corporation, Des Plaines, Ill.

[22] Filed: Apr. 1, 1969

[21] Appl. No.: 812,196

[52] U.S. Cl. ..............................307/233, 307/229, 307/246, 307/247, 307/251, 307/295, 324/78 E, 328/127

[51] Int. Cl. ..........................................................H03k 5/20

[58] Field of Search..................307/229, 233, 246, 247, 251, 307/254, 255, 295, 304, 313; 328/127, 140; 324/78 E, 68 A, 78 I, 70 CA, 70 CG, 169, 174, 175; 340/171

[56] References Cited

UNITED STATES PATENTS

| | | | |
|---|---|---|---|
| 3,017,521 | 1/1962 | Herstedt | 307/233 |
| 3,119,029 | 1/1964 | Russell | 307/254 X |
| 3,165,650 | 1/1965 | White | 307/246 |
| 3,246,176 | 4/1966 | Nazareth, Jr. | 307/304 X |
| 3,333,109 | 7/1967 | Updike | 328/140 X |
| 3,395,291 | 7/1968 | Bogert | 307/251 X |
| 3,444,393 | 5/1969 | Sassler | 307/229 |
| 3,488,520 | 1/1970 | Hunter | 307/251 |

OTHER PUBLICATIONS

D' Agostino, Reactive Emitter-Follower Logic Gate, RCA TN No. 791, October 2, 1968, pp. 1 & 2.

*Primary Examiner*—Stanley T. Krawczewicz
*Attorney*—Lowell C. Bergstedt, Walter C. Ramm and Helmuth A. Wegner

[57] ABSTRACT

A count rate circuit employing a pair of field effect transistors in the charging and discharging paths of a capacitor to provide temperature stable operation.

3 Claims, 4 Drawing Figures

INVENTOR
John L. Neathery, Jr.
BY Lowell C. Bergstedt
ATTORNEY

FREQUENCY TO VOLTAGE CONVERTER WITH IMPROVED TEMPERATURE STABILITY

Count rate circuits are generally used to convert an AC signal into a DC voltage which is proportional to the frequency of the AC signal. A particular type of count rate circuit commonly called a "dipper and bucket" circuit has been widely used. Typical prior art circuits of the dipper and bucket type employ switching diodes and pump circuit transistors, and because of the temperature dependent characteristics of the diodes and transistors, such count rate circuits suffer from instability when employed in environments of widely different ambient temperatures.

The principal object of this invention is to provide an improved count rate circuit.

More particularly it is an object of this invention to provide a count rate circuit employing digital switching techniques with temperature stable field effect transistors as primary switching elements.

In accordance with this invention a count rate circuit of the type having a charging circuit which includes a capacitor and a source of charging current and a discharging circuit which includes the same capacitor and an integrating circuit is provided with an improvement comprising a pair of transistor switching means interposed in the charging circuit and the discharging circuit with each having selectable first and second states to provide paths of substantially temperature independent low and high resistance values, respectively, and a driver circuit means operating in response to the input pulses to produce repetitively alternating opposite states in said switching means at a rate proportional to the frequency of the input pulses. In a preferred embodiment, the transistor switching means is in each case a field effect transistor which acts as a low value resistor in its ON state and a high value resistor in its OFF state. The driver circuit means may utilize a pair of flip-flops (bistable circuit elements) and associated logic to produce a four state switching sequence for the two field effect transistors in response to four input pulses or a pair of one-shot multivibrator circuits (monostable circuit elements) to produce an operating pulse sequence in response to each input pulse. The selection of the type of driver circuit and the type of field effect transistors will be based on the anticipated operating parameters of the count rate circuit.

The principal advantage obtained by incorporating the field effect transistors in the charging and discharging circuits together with a digital type driver circuit is the achievement of improved temperature stability. The improved temperature stability will increase the accuracy of the measurements being made, particularly under adverse conditions of widely varying ambient temperatures experienced in borehole logging or other field measurements. In addition, the digital triggering or driving of the field effect transistors provides for improved timing accuracy for the charging and discharging cycle of the circuit operation.

Other objects, features, and advantages of this invention will become apparent from a consideration of the following detailed description in conjunction with the accompanying drawings in which.

Figure 1:
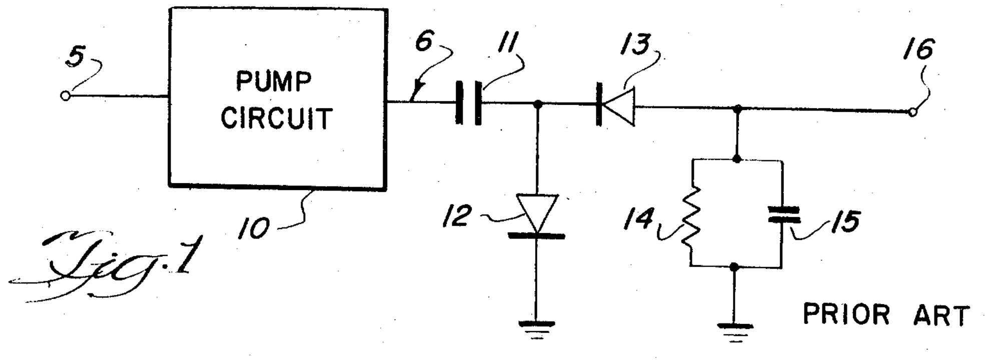
FIG. 1 is a schematic diagram of a prior art count rate circuit.

As shown in FIG. 1, a prior art count rate circuit which has been widely used comprises essentially a pump circuit 10 receiving an input pulse train on input terminal 5, and a charging capacitor 11, a pair of switching diodes 12 and 13 and an integrating circuit composed of resistor 14 and capacitor 15 in parallel, connected in the manner shown to output 6 from pump circuit 10. The operation of the circuit shown in FIG. 1 is relatively simple. Pump circuit 10 responds to an input pulse by first applying a positive voltage on output 6 for a period of time, which permits capacitor 11 to charge up via a current path through diode 12 which is biased ON. Correspondingly, no current flows through diode 13 because it is biased to an OFF state. Then pump circuit 10 applies a ground reference voltage on output lead 6 for a period of time and capacitor 10 discharges through diode 13 into the integrating circuit composed of resistor 14 and capacitor 15. The integrated discharge current from capacitor 11 provides a DC voltage level on output terminal 16. This operating sequence takes place for each input pulse on input terminal 5 so that the alternate charging and discharging of capacitor 11 produces an essentially DC voltage on output terminal 16 which is proportional to the frequency of charging and discharging and thus to the frequency of the input pulses. This type of count rate circuit is called a dipper and bucket circuit because the capacitor 11 is considered to be dipping charge during the ON portion of the pump and then pouring that charge into the bucket during a discharge cycle when the pump is OFF.

When the count rate circuit of FIG. 1 is used in circumstances where substantial variations in temperature are likely to occur, the variations in the temperature dependent characteristics of the switching diodes and the pump circuit transistors will produce variations in the amounts of charge transfer during each cycle. Consequently, the DC voltage present on output lead 16 for a particular input pulse frequency will vary considerably with changes in temperature.

Figure 2:
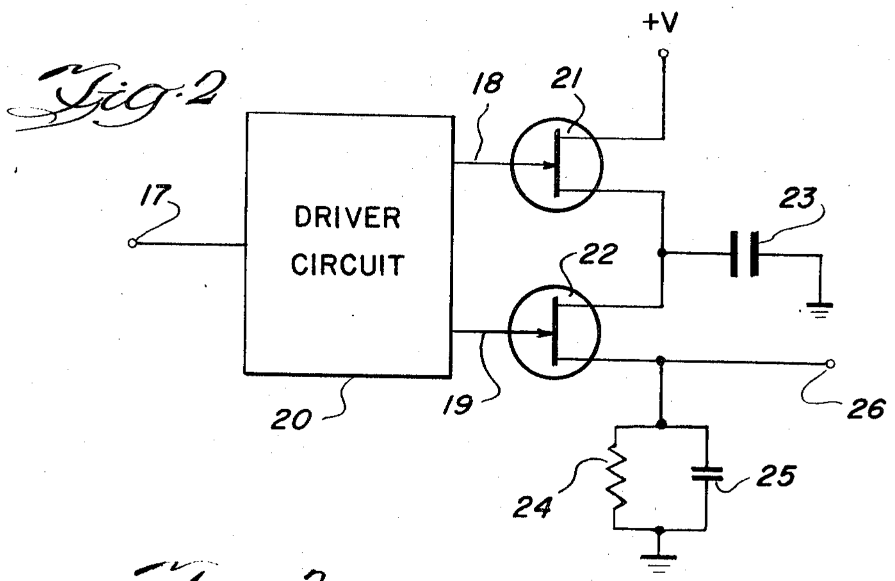
FIG. 2 is a schematic diagram of a count rate circuit in accordance with this invention.

The count rate circuit of this invention, shown in FIG. 2, operates on somewhat the same principal as the prior art circuit shown in FIG. 1, but has greatly improved operating stability, particularly from the standpoint of temperature sensitivity. As shown in FIG. 2, a driver circuit 20 receives input pulses on terminal 17 and produces appropriate outputs on output leads 18 and 19. Output leads 18 and 19 are coupled, as shown, to field effect transistors 21 and 22 which may be junction or insulated gate types. Drain and source electrodes of transistor 21 are coupled, respectively, to a source of positive voltage and one terminal of capacitor 23. The other side of capacitor 23 is connected to a ground reference potential. The drain and source electrodes of transistor 22 are coupled to one terminal of capacitor 23 and to an integrating circuit composed of resistor 24 and capacitor 25. Output terminal 26 receives the voltage across the integrating circuit.

It can be seen from FIG. 2 that with transistor 21 in an ON condition and transistor 22 in an OFF condition, capacitor 23 will charge through the low resistance source to drain circuit of transistor 21, whereas little or no current will flow through the source to drain circuit of transistor 22 because of its high resistance value in the OFF condition. If transistor 21 is then turned OFF and transistor 22 is turned ON, capacitor 23 will discharge through the relatively low resistance source to drain circuit of transistor 22 into the integrating circuit composed of resistor 24 and capacitor 25. Driver circuit 20 controls the turning ON and OFF of transistors 21 and 22 in one of several known manners. The improved operation of the count rate circuit is obtained because the respective source to drain resistance values of the field effect transistors are substantially temperature independent so that the amount of charge transferred will correspondingly be substantially independent of the temperature at which the circuit is operated. Moreover, the digital nature of the driver circuit provides more uniformity in the operating time characteristics of the system because the ON and OFF times of transistors 21 and 22 can be made relatively independent of temperature characteristics of elements in driver circuit 20.

As mentioned previously, driver circuit 20 can employ a pair of flip-flops or bistable circuit elements to provide the operating sequence for transistors 21 and 22, or a pair of one-shot multivibrators or monostable circuit elements may be employed. If a pair of flip-flops is employed, one cycle of operation will be produced by four input pulses, whereas only one input pulse will trigger a complete operating cycle when one-shot multivibrators are employed.

Figure 4:
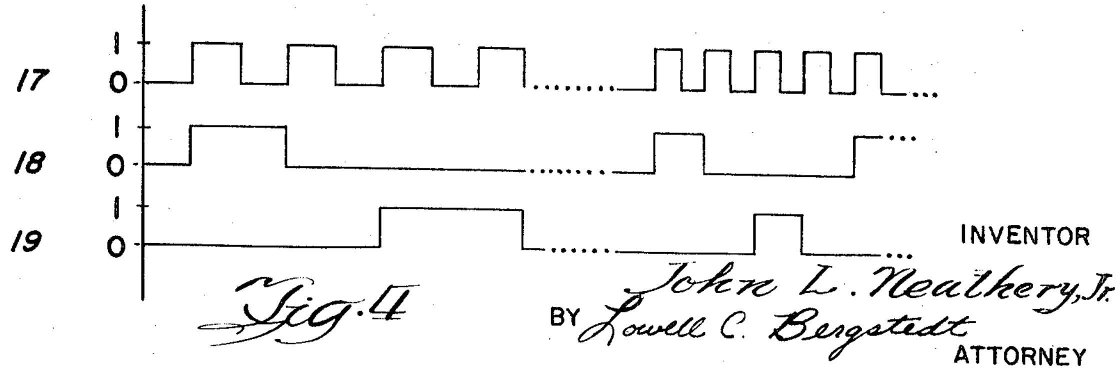
FIG. 4 is an operating pulse diagram useful in describing the operation of one embodiment of a portion of the count rate circuit of FIG. 2.

The operation of the count rate circuit shown in FIG. 2 with flip-flops in the driver circuit will be described in connection with FIG. 4. Assume that at the time the first input pulse occurs, both flip-flops are in an OFF condition so the outputs on leads 18 and 19 are both 0 or at ground potential. The first pulse on input terminal 17 turns on the first flip-flop to put a positive voltage (1) on lead 18. This positive output signal remains until a second pulse appears on input terminal 17, at which time the first flip-flop turns OFF and the output on lead 18 becomes ground potential (0) again. The second flip-flop has remained OFF during the first two pulses but is turned ON by the third pulse to place a positive voltage (1) on lead 19. The positive voltage on lead 19 remains until the second flip-flop is turned OFF by the fourth pulse. The positive voltage on lead 18 caused by the first input pulse turns ON transistor 21 to permit capacitor 23 to charge, and the source to drain resistance of transistor 21 is small enough to permit capacitor 23 to charge fully. When the positive voltage disappears on lead 18 during the second pulse, transistor 21 is turned OFF and capacitor 23 holds the charge it received. When lead 19 goes positive with the third input pulse, transistor 22 turns ON to permit capacitor 23 to discharge into the integrating circuit. As shown in FIG. 4, the rate at which capacitor 23 is charged and discharged is dependent on the frequency of input pulses, and consequently, the voltage on output terminal 16 is an average DC value proportional to the input pulse frequency. It will be appreciated that it is important to prevent any possibility of both transistors 21 and 22 being ON at the same time, and the dual flip-flop type of driver circuit effectively accomplishes this because transistor 21 is turned OFF for a brief timing interval before transistor 22 is turned ON.

The operation of the dual one-shot multivibrator type of driver circuit is generally as follows. An input pulse on terminal 17 would cause the first one-shot multivibrator to turn ON and place a positive voltage on output lead 18 to turn on transistor 21 and charge capacitor 23. After a predetermined time, the first multivibrator turns itself OFF, and the turning OFF of the first multivibrator causes the second one-shot multivibrator to turn ON a short time later. This puts a positive voltage on output lead 19 and turns ON transistor 22 to discharge capacitor 23 into the integrating circuit. When the second one-shot multivibrator turns itself OFF the driver circuit is essentially reset and is ready to receive the next input pulse.

It will be appreciated that the time and temperature characteristics of the count rate circuit shown in FIG. 2 and described above will be considerably more stable than the prior art circuit shown in FIG. 1 because of the positive switching characteristics produced by the driver circuit and the stable behaviour of the field effect transistors under widely varying temperatures.

Figure 3:
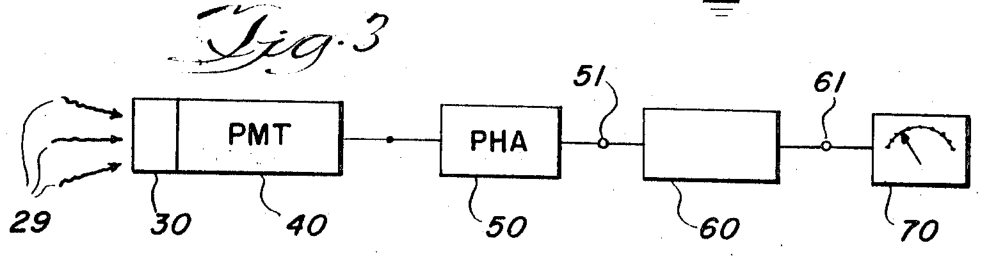
FIG. 3 is a block schematic diagram of a scintillation counting system incorporating a count rate circuit as a portion of the system.

As shown in FIG. 3, a typical system in which a count rate circuit is used includes a sodium iodide crystal 30, or other scintillator, capable of detecting input radiation 29, such as gamma rays, and converting each detected radiation into a weak light pulse. The light pulses are detected by photomultiplier tube 40 and changed by it and its associated amplifiers into electrical pulses. These electrical pulses are generally coupled through a pulse height analyzer circuit 50 to eliminate pulses caused by background radiation and other spurious pulses. The pulse height analyzer may be a single integral discriminator, a differential discriminator or a single channel pulse height analyzer capable of being set to pass pulses within a selected band of amplitudes. The output of the pulse height analyzer 50 provides the input on terminal 51 to a count rate circuit 60 which translates the frequency of pulses from analyzer 50 into a DC voltage on output terminal 61 which is proportional to the frequency of input pulses. Terminals 51 and 61 in FIG. 3 correspond to input terminal 17 and output terminal 26 respectively in FIG. 2. The DC voltage on output terminal 61 may be displayed by a meter 70 or any other form of voltage indicating or recording device.

The above description of preferred embodiments of this invention is given by way of example only, and it should be understood that numerous modifications could be made therein without departing from the scope of this invention as claimed in the following claims:

I claim:

1. In a circuit for providing an output indication of the frequency of input pulses, having a charging circuit, including a capacitor and a source of charging current, and a discharging circuit, including said capacitor and an integrating circuit, the improvement comprising:

first and second transistor switching means interposed, respectively, between said capacitor and said source in said charging circuit and between said capacitor and said integrating circuit in said discharging circuit, each of said means having selectable first and second states providing paths of substantially temperature independent low and high resistance values, respectively; and driver circuit means operative in response to said input pulses to produce repetitively alternating opposite states in said switching means at a rate proportional to said frequency of said input pulses thereby alternately to charge said capacitor and discharge said capacitor into said integrating circuit to develop an output voltage across said integrating circuit proportional to said frequency of said input pulses.

2. The circuit as claimed in claim 1, wherein said first and second transistor switching means each comprise a field effect transistor having a low drain to source resistance value in said first ON state and a high drain to source resistance value in said second OFF state, said values being substantially temperature independent.

3. In a circuit for providing an output indication of the frequency of input pulses, having a charging circuit, including a capacitor connected between a source of DC voltage and ground reference potential, and a discharging circuit, including said capacitor and an integrating circuit, the improvement comprising:

a first field effect transistor interposed in said charging circuit with source and drain electrodes thereof connected between said capacitor and said source;

a second field effect transistor interposed in said discharging circuit with source and drain electrodes thereof connected between said capacitor and said integrating circuit; and means responsive to said input pulses to switch said transistors alternately between opposite ON and OFF states to activate alternately said charging and discharging circuits at a rate proportional to the frequency of said input pulses.

* * * * *